United States Patent
Augot et al.

(10) Patent No.: US 8,881,706 B2
(45) Date of Patent: Nov. 11, 2014

(54) COMBUSTION ENGINE COMBUSTION CHAMBER

(75) Inventors: Sylvain Augot, Noiseau (FR); Anne-Marie Doisy, Joinville sur Juine (FR); Gregory Musq, La Ferte (FR)

(73) Assignee: Renault S.A.S., Boulogne-Billancourt (FR)

( * ) Notice: Subject to any disclaimer, the term of this patent is extended or adjusted under 35 U.S.C. 154(b) by 513 days.

(21) Appl. No.: 12/809,410

(22) PCT Filed: Dec. 15, 2008

(86) PCT No.: PCT/EP2008/067564
§ 371 (c)(1),
(2), (4) Date: Dec. 23, 2010

(87) PCT Pub. No.: WO2009/077506
PCT Pub. Date: Jun. 25, 2009

(65) Prior Publication Data
US 2011/0094470 A1    Apr. 28, 2011

(30) Foreign Application Priority Data
Dec. 19, 2007 (FR) ...................................... 07 59981

(51) Int. Cl.
*F02B 23/06* (2006.01)
*F02B 3/06* (2006.01)

(52) U.S. Cl.
CPC ........... *F02B 23/0672* (2013.01); *Y02T 10/125* (2013.01); *F02B 3/06* (2013.01)
USPC .................. 123/193.6; 123/193.4; 123/193.1; 123/298; 123/299; 123/301

(58) Field of Classification Search
CPC ............. F02B 23/0651; F02B 23/0648; F02B 23/0672; F02B 23/0675; F02B 23/0696; Y02T 10/125
USPC ................................ 123/193.4, 298, 299, 301
See application file for complete search history.

(56) References Cited

U.S. PATENT DOCUMENTS 5,099,809 A * 3/1992 Kawatani et al. ............. 123/276
5,868,112 A * 2/1999 Mahakul et al. .............. 123/263
(Continued)

FOREIGN PATENT DOCUMENTS

| CN | 2721886 | 8/2005 |
| EP | 0412552 | 2/1999 |
| FR | 2818325 | 6/2002 |
| FR | 2878906 | 6/2006 |
| FR | 2879676 | 6/2006 |
| FR | 2881182 | 7/2006 |

*Primary Examiner* — Lindsay Low
*Assistant Examiner* — Kevin Lathers
(74) *Attorney, Agent, or Firm* — Oblon, Spivak, McClelland, Maier & Neustadt, L.L.P.

(57) ABSTRACT

A piston for an internal combustion engine, for example a diesel engine, including a body delimited laterally by a skirt and configured to collaborate with walls of a cylinder of axis of revolution C in which the piston can slide along the axis C, the piston including a transverse face including a central pip, a peripheral ring, and a bowl of axis of revolution B that extends from the central pip towards the peripheral ring to which it connects at a lip of thickness Ep, the bowl including, in substantial vertical alignment with the lip, a torus in profile, for example of dome-shaped, of maximum radius capable of guiding fuel injected under the lip in the region of a re-entrant zone towards the central pip. The tip of the central pip exhibits a flattened region centred on the axis of revolution B of the bowl, of a width Lt ranging between 0 mm and 5 mm, or substantially equal to 2.5 mm.

10 Claims, 1 Drawing Sheet

(56) References Cited

U.S. PATENT DOCUMENTS

| | | | |
|---|---|---|---|
| 6,705,273 B1 * | 3/2004 | Liu et al. | 123/263 |
| 6,997,158 B1 * | 2/2006 | Liu | 123/279 |
| 7,210,448 B2 * | 5/2007 | Stanton et al. | 123/298 |
| 7,370,627 B2 * | 5/2008 | Mahakul et al. | 123/276 |
| 7,472,678 B2 * | 1/2009 | Tsujimoto et al. | 123/299 |
| 2006/0070603 A1 | 4/2006 | Stanton et al. | |
| 2007/0272191 A1 * | 11/2007 | Tsujimoto et al. | 123/193.5 |
| 2011/0041794 A1 | 2/2011 | Dingreville et al. | |
| 2011/0048364 A1 | 3/2011 | Besson et al. | |

\* cited by examiner

COMBUSTION ENGINE COMBUSTION CHAMBER

BACKGROUND

The invention relates in general to the design of combustion engines, particularly compression-ignition internal combustion engines.

Motor manufacturers are faced with the problem of improving engine drivability while at the same time ensuring that the engines meet increasingly severe imposed emissions standards, each change in a standard resulting in significant technical developments and in the use of additional and/or more complicated emissions-control devices which prove to be expensive and which may lead to drops in performance levels.

Manufacturers are looking to increase the drivability of smaller engines which develop increasingly high specific power, notably by resorting to double supercharging in order to increase the amount of air admitted to the engine combustion chamber over a broad range of engine speeds.

This type of engine needs to be developed in such a way that it develops high specific power while at the same time emitting the smallest possible amount of pollutant emissions.

BRIEF SUMMARY

It is an object of the present invention to propose a combustion chamber for an internal combustion engine that is improved and that is able notably to reduce the level of nitrogen oxides and particulates exhaust emissions.

One subject of the invention is a piston for an internal combustion engine, notably for a diesel engine, comprising a body laterally delimited by a skirt able to collaborate with the walls of a cylinder of axis of revolution C in which the piston is able to slide along this axis C, said piston comprising a transverse face which comprises a central pip, a peripheral crown ring and a bowl of axis of revolution B which extends from the central pip toward the peripheral crown ring to which it is connected at a lip of thickness Ep, said bowl comprising, substantially in vertical alignment with the lip, a torus in profile, preferably half-dome shaped, of maximum radius Rt, able to guide a fuel injected under the lip in a reentrance zone R toward the central pip, notable in that the top of the central pip has a flattened zone centered on the axis of revolution B of the bowl and of a width Lt of between 0 mm and 5 mm and preferably substantially equal to 2.5 mm.

Use of a piston according to the invention notably allows the following advantages to be realized:
the post-treatment systems do not have to be made more complicated and more expensive;
the nitrogen oxides emissions are reduced in order to comply with emissions control standards.

According to some particular embodiments, the piston has one or more of the following features:
the top of the pip situated on the axis of revolution B of the bowl rises up to a height that is a distance Dt of between 5.4 mm and 7 mm below the peripheral crown ring;
the central pip slopes toward the torus by an angle A, measured from the axis of revolution B of the bowl in the geometric direction, of between 29.5° and 34.5°;
the bowl is centered in the cylinder, the axis of revolution B of the bowl coinciding with the axis of revolution C of the cylinder;
the maximum radius of curvature Rt of the torus is between 5 mm and 7 mm;
the lip is situated a distance De/2 from the axis of revolution B of the bowl, the distance De being between 49.5 mm and 52 mm;
the torus is situated a distance Db/2 from the axis of revolution B of the bowl, the distance Db being between 53.5 mm and 55.5 mm;
the difference in distances, with respect to the axis of revolution B of the bowl, of the end of the crown ring De/2 and of the end of the torus Db/2 is between 1.5 mm and 3.5 mm;
the maximum depth P of the bowl is between 14.3 mm and 15.5 mm.

A further subject of the invention is an internal combustion engine designed for strict emissions control standards in terms of the emissions of nitrogen oxides and particulates and, more specifically, an engine of the diesel type comprising at least one piston according to the invention.

This internal combustion engine of the diesel type has a cylinder of axis of revolution C the upper end of which is closed by a cylinder head provided with an underside which contributes to defining a combustion chamber together with the transverse face of the piston the piston bowl of which is centered about an axis of revolution B that coincides with the axis C, said engine comprising, opening onto the underside of the cylinder head, at least one inlet duct that can be closed off by an inlet valve and at least one exhaust duct that can be closed off by an exhaust valve, a preheater plug and a fuel injector the tip of which opens into the combustion chamber substantially at the axis of revolution of the cylinder C.

BRIEF DESCRIPTION OF THE DRAWINGS

Other features and advantages of the invention will become clearly apparent from the description of the embodiment thereof given hereinafter by way of entirely nonlimiting indication with reference to the following figures.

DETAILED DESCRIPTION

Figure 1:
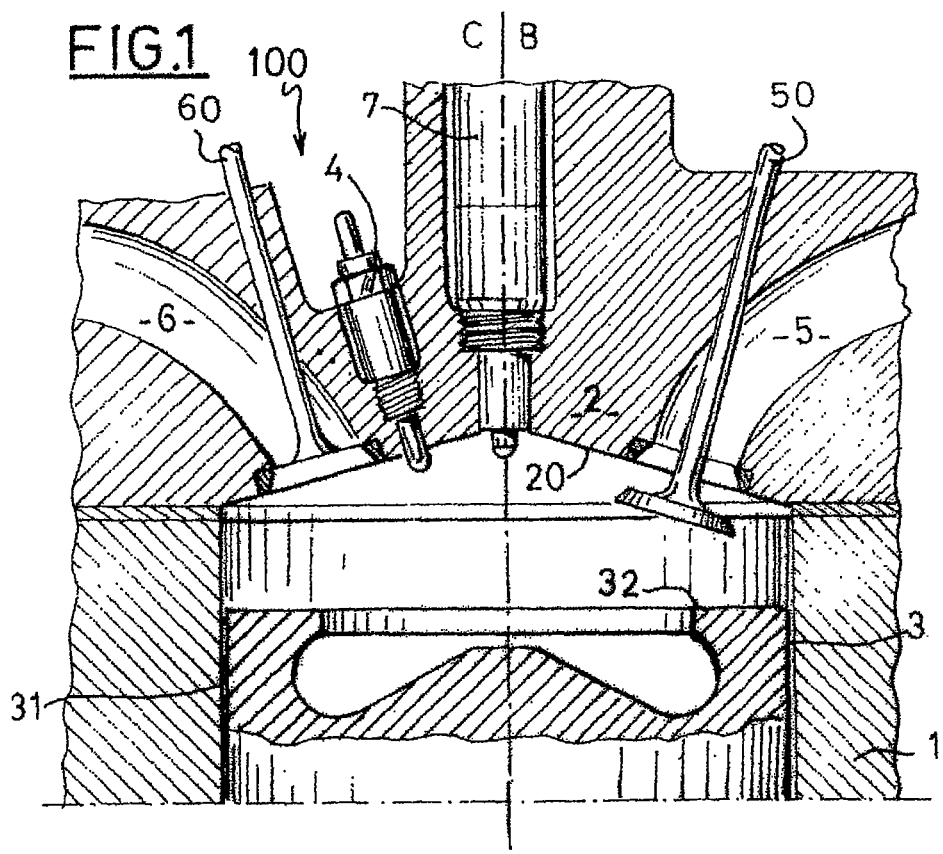
FIG. 1 is a partial schematic cross section of an internal combustion engine according to the invention.

FIG. 1 illustrates an internal combustion engine 100, notably for a diesel engine, comprising at least one cylinder 1 of axis of revolution C, a cylinder head 2 and a piston 3.

In the remainder of the description, this axis of revolution C will be considered to be oriented upward, toward the cylinder head 2.

The piston 3 is mounted in the cylinder 1 such that it can slide along the axis of revolution of the cylinder C, and has a piston body designed to accept a pin to connect the piston to the little end of a driving connecting rod, said body being laterally delimited by a piston skirt 31 running parallel to the axis of revolution of the cylinder C and collaborating with an internal wall of the cylinder 1. The piston further comprises a transverse face 32 which, together with the underside 20 of the cylinder head 2, contributes to delimiting a combustion chamber of the cylinder 1.

The fresh air or a mixture of fresh air and of recirculated exhaust gases is admitted to the combustion chamber via at least one inlet duct 5 formed in the cylinder head 2 and which can be closed off by at least one inlet valve 50.

The residue of combustion of the air-fuel mixture introduced is removed via at least one exhaust duct 6 formed in the cylinder head 2 and which can be closed off via at least one exhaust valve 60.

A preheater plug 4 is fitted in the cylinder head 2, its end opening into the combustion chamber so that it can heat the air-fuel mixture during cold starts.

A fuel injector 7 is fitted in the cylinder head 2 and opens into the combustion chamber substantially along the axis of revolution C of the cylinder 1.

Figure 2:
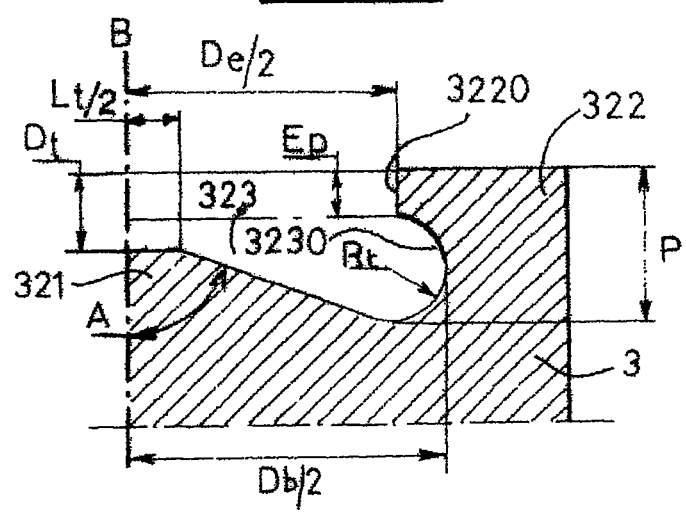
FIG. 2 is a partial cross section on a plane containing the axis of revolution of the piston bowl, showing the detail of the crown part of a piston according to the invention, on the inlet side.

As depicted in FIG. 2 which, in partial cross section on an axial plane, details the upper part of a piston 3 according to the invention, the transverse face 32 comprises a central pip 321, a peripheral crown ring 322 and an annular cavity or bowl 323 of axis of revolution B that coincides with the axis of revolution of the cylinder C, said bowl 323 extending from the central pip 321 toward the peripheral crown ring 322 to which it is connected.

As an alternative, the bowl 323 may be offset in the cylinder 1, the axes of revolution C of the cylinder 1 and B of the bowl 323 therefore being able to be offset from one another by a distance preferably shorter than a value substantially equal to 3 mm.

The peripheral crown ring 322 extends laterally from the skirt 31 of the piston 3 toward the axis of revolution B of the bowl 323 as far as an end that forms a lip 3220 of thickness Ep, corresponding to the distance of the reentrant portion R of the peripheral crown ring 322, underneath which the bowl 323 has a torus 3230 in profile half-dome shaped, with a maximum radius of curvature Rt of between 5 mm and 7 mm.

The lip 3220 is situated a distance De/2 from the axis of revolution B of the bowl 323, the distance De being between 49.5 mm and 52 mm.

The torus 3230 is situated a distance Db/2 from the axis of revolution B of the bowl 323, the distance Db being between 53.5 mm and 55.5 mm.

The injector 7 is designed selectively to inject fuel in the form of jets directed into an upper region of the torus 3230 adjacent to a bottom edge of the lip 3220, also known as a reentrant edge R, so as to improve the way in which the jet of fuel is guided from this reentrant edge R by rolling along the walls of the torus 3230 toward the bottom of the bowl, where the oxygen is to be found as the piston 3 effects its upstroke, so as to reduce smoke and so as to enable the gases to be circulated toward the central pip 321.

For preference, a reentrant edge R will be maintained by keeping the difference in distances, with respect to the axis of revolution B of the bowl 323, of the end of the crown ring De/2 and of the end of the torus Db/2 between 1.5 mm and 3.5 mm.

The bowl 323 is bordered by a lip 3220 of thickness Ep corresponding to the distance of the reentrant edge R of the peripheral crown ring 322.

The maximum depth P of the bowl 323 is between 14.3 mm and 15.5 mm. The ratio Db/P gives the bowl 323 a substantial width which allows effective exploitation of the air under full load conditions, making it possible to achieve high specific performance.

Combining this design of the reentrant edge R, with the torus 3230 and with a maximum bowl 323 depth P allows improved guidance of the jet of fuel toward a volume of air trapped in the bottom of the bowl 323.

The top of the central pip 321 has a flattened zone centered on the axis of revolution B of the bowl 320 and of a width Lt of between 0 mm and 5 mm and preferably substantially equal to 2.5 mm. The top of the central pip 321 rises up to a height that is a distance Dt below the height of the peripheral crown ring 320, this distance Dt being between 5.4 mm and 7 mm.

Truncating the top of the central pip 321 and the distance Dt to the top of the peripheral crown ring 320 makes it possible to limit interactions between the jets of fuel sprayed toward the bottom of the bowl with the central pip 321 and notably the top thereof, thus making it possible to reduce emissions of smoke and unburnt fuel.

Truncating the top of the central pip 321 in this way also allows the central pip 321 to slope gently toward the torus 323 by an angle A. The angle A of the slope, measured from the axis of revolution B of the bowl 320 in the geometric direction is between 29.5° and 34.5°. This then encourages the vertical component of the combustion movement which, with the width of the bowl 323, would otherwise have a tendency to be directed predominantly in a horizontal direction.

Having the central pip 321 slope at an angle A like this allows the soot formed by combustion at the bottom of the bowl 323 to be extracted toward the central pip 321 for improved post-oxidation leading to a reduction in smoke.

An internal combustion engine 100 provided with a double supercharging device and with a piston 3 that combines these features is particularly advantageous in use by comparison with an internal combustion engine that does not have double supercharging.

What has actually been found is that such an improved engine 100 allows the specific power to be increased by around 25% while at the same time maintaining the same level of pollutant emissions.

The invention claimed is:

1. A piston for an internal combustion engine, comprising:
a body laterally delimited by a skirt configured to collaborate with walls of a cylinder of axis of revolution (C) in which the piston can slide along the axis (C), the piston comprising a transverse face that comprises a central pip, a peripheral crown ring, and a bowl of axis of revolution (B) that extends from the central pip toward the peripheral crown ring to which it is connected at a lip of thickness (Ep), the bowl comprising, substantially in vertical alignment with the lip, a torus in profile, or half-dome shaped, of maximum radius (Rt), configured to guide a fuel injected under the lip in a re-entrance zone (R) toward the central pip,
wherein the top of the central pip includes a flattened zone centered on the axis of revolution (B) of the bowl and of a width (Lt) of between greater than 0 mm and 5 mm, and the flattened zone extends from a first corner located between greater than 0 mm and 2.5 mm from the axis of revolution (B) of the bowl in a first direction to a second corner located between greater than 0 mm and 2.5 mm from the axis of revolution (B) of the bowl in a second direction opposite to the first direction, and
wherein the top of the pip situated on the axis of revolution (B) of the bowl rises up to a height that is a distance (Dt) of between 5.4 mm and 7 mm below the peripheral crown ring.

2. The piston as claimed in claim 1, wherein the central pip slopes toward the torus by an angle (A), measured from the axis of revolution (B) of the bowl in the geometric direction, of between 29.5° and 34.5°.

3. The piston as claimed in claim 1, wherein the bowl is centered in the cylinder, the axis of revolution (B) of the bowl coinciding with the axis of revolution (C) of the cylinder.

4. The piston as claimed in claim 1, wherein the maximum radius of curvature (Rt) of the torus is between 5 mm and 7 mm.

5. The piston as claimed in claim 1, wherein the lip is situated a distance (De)/2 from the axis of revolution (B) of the bowl, the distance (De) being between 49.5 mm and 52 mm.

6. The piston as claimed in claim 1, wherein the torus is situated a distance (Db)/2 from the axis of revolution (B) of the bowl, the distance (Db) being between 53.5 mm and 55.5 mm.

7. The piston as claimed in claim 1, wherein the difference in distances, with respect to the axis of revolution (B) of the bowl, of the end of the crown ring (De)/2 and of the end of the torus (Db)/2 is between 1.5 mm and 3.5 mm.

8. The piston as claimed in claim 1, wherein the maximum depth (P) of the bowl is between 14.3 mm and 15.5 mm.

9. An internal combustion engine of diesel type, comprising at least one piston as claimed in claim 1.

10. The piston as claimed in claim 1, wherein the width (Lt) is equal to 2.5 mm, the first corner is located 1.25 mm from the axis of revolution (B) of the bowl in the first direction, and the second corner is located 1.25 mm from the axis of revolution (B) of the bowl in the second direction.

\* \* \* \* \*